Sept. 8, 1936.  J. SUNNEN  2,053,584
DEVICE FOR ASSEMBLING CONNECTING ROD BEARINGS PREPARATORY TO GRINDING
Filed May 18, 1935   2 Sheets-Sheet 1
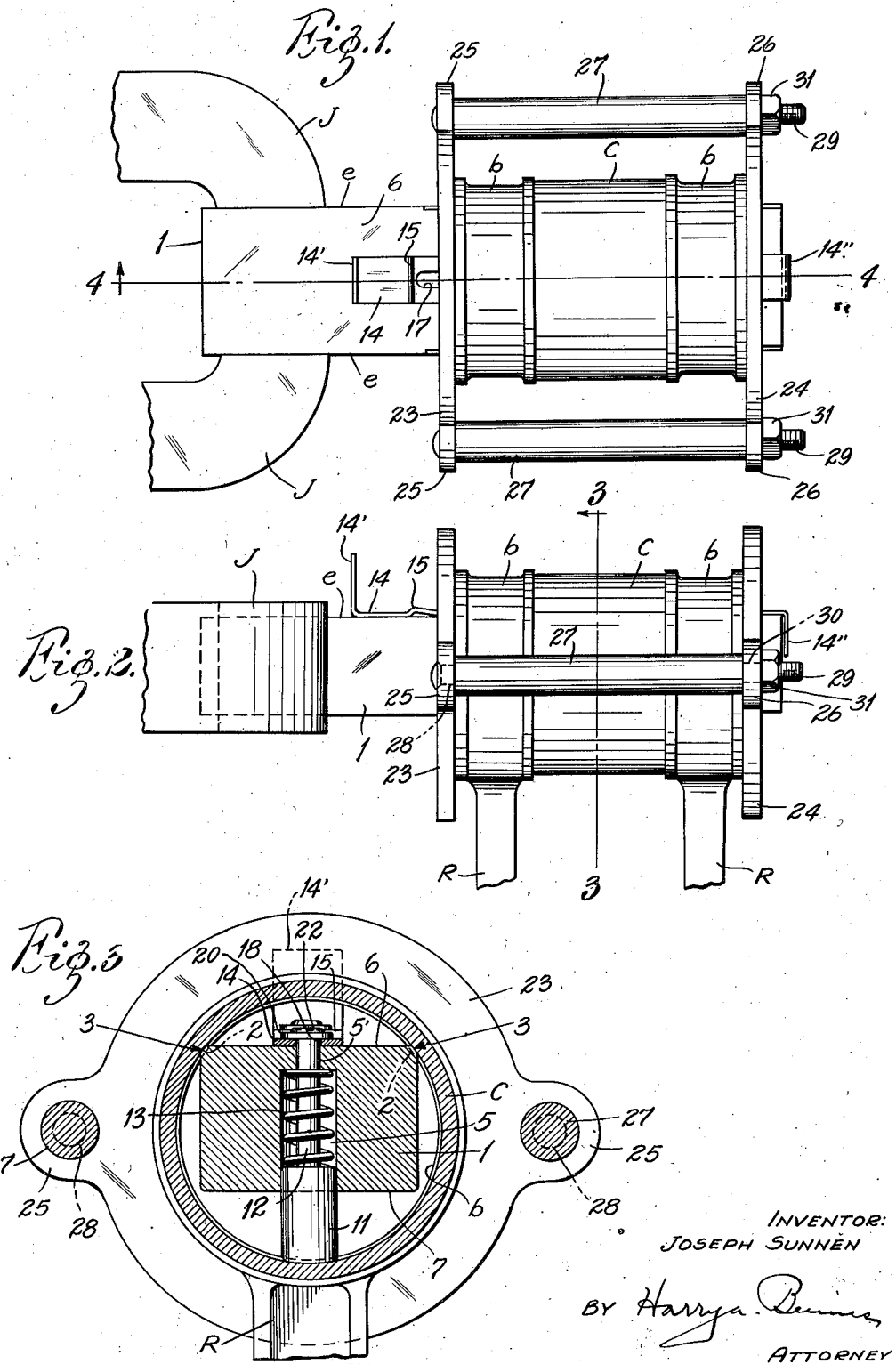
INVENTOR:
JOSEPH SUNNEN
BY Harry A. Benner
ATTORNEY Sept. 8, 1936. J. SUNNEN 2,053,584
DEVICE FOR ASSEMBLING CONNECTING ROD BEARINGS PREPARATORY TO GRINDING
Filed May 18, 1935 2 Sheets-Sheet 2

INVENTOR:
JOSEPH SUNNEN
BY Harry L. Bennel
ATTORNEY.

Patented Sept. 8, 1936

2,053,584

UNITED STATES PATENT OFFICE 2,053,584

DEVICE FOR ASSEMBLING CONNECTING ROD BEARINGS PREPARATORY TO GRINDING

Joseph Sunnen, Kirkwood, Mo.

Application May 18, 1935, Serial No. 22,221

8 Claims. (Cl. 51—217)

My invention has relation to improvements in devices for assembling connecting rod bearings preparatory to grinding the same, and it consists in the novel features of construction more fully set forth in the specification and pointed out in the claims.

More particularly the device comprises a mandrel and a fixture for cooperating therewith to clamp connecting rod bearings in axial alinement and in spaced relation, since it is the principal object of the invention to mount at least two connecting rods in a fixture so that the bearings thereof may be simultaneously ground by a single grinding tool. Connecting rod bearings cannot be satisfactorily ground or reamed by individual operation over a rotating mandrel or reamer because they are not of sufficient width to be firmly supported by the tool during the grinding or reaming operation.

In attempting to grind a single bearing it is impossible for the operator to move the bearing over the tool with a true rectilinear motion to obtain a true cylindrical bearing. An attempt to grind a single bearing will result in a more or less funnel shaped surface due to the unavoidable teetering or rocking of the bearing during the manipulation of the operator. By the use of my invention it is possible to grind narrow connecting rod bearings on a mandrel type of grinder so that the ground surface of said bearings will be truly cylindrical. In accomplishing my object I provide a mandrel in which the bearings are supported in spaced relation and brought into substantial axial alinement in which relation they are securely held in a clamping fixture. The assembled bearings and fixture are then handled as a unitary device for the simultaneous grinding of the mounted bearings.

Figure 4:
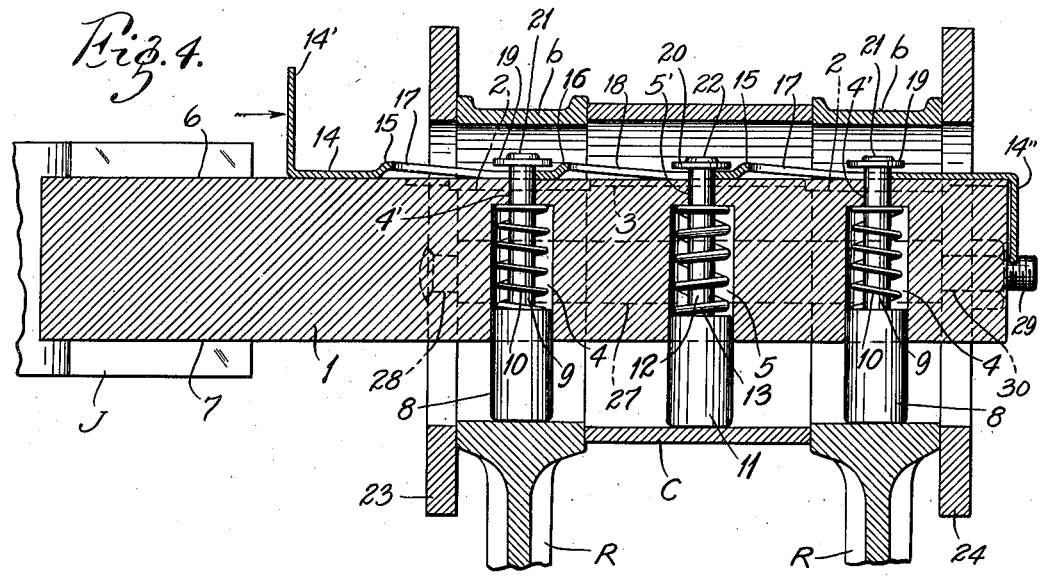
Figure 5:
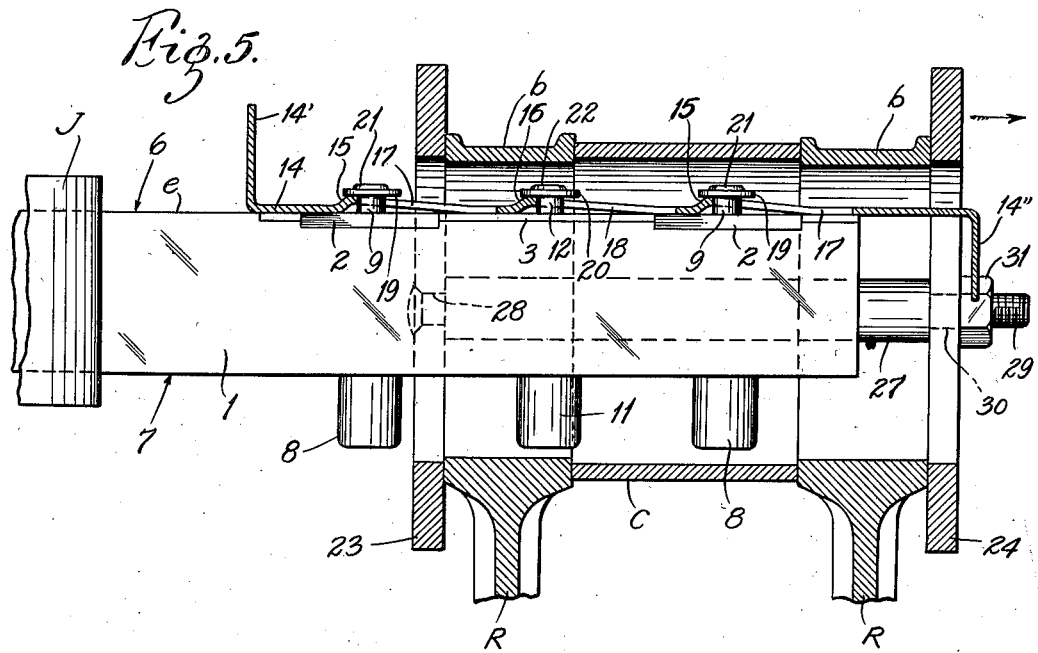

These objects, as well as other advantages inherent in the invention, such as simplicity and ease of operation, will be better apparent from a detailed description of the same in connection with the accompanying drawings, in which:

Figure 1 shows a top plan of the mandrel held in the jaws of a vise and the bearings supported in spaced relation on said mandrel with the clamping fixture applied thereto to hold the bearings in such assembled relation for subsequent grinding; Fig. 2 is a side elevation of the device shown in Fig. 1; Fig. 3 is a vertical cross-section taken through the fixture on the line 3—3 of Fig. 2; Fig. 4 is a vertical, longitudinal section of the device taken on the line 4—4 of Fig. 1; and Fig. 5 is a combined side elevation and longitudinal section showing the assembled bearings released from the mandrel and partly removed therefrom.

Referring to the drawings, I represents a mandrel formed from a solid steel bar (or equivalent) and held at one end in the jaws J, J, of a suitable vise. The mandrel I in the present instance is generally rectangular in cross-section, and the two top edges e, e each have narrow machined surfaces 2, 2 lying in a common plane and spaced by a somewhat longer machined surface 3 lying in a plane above that of the surfaces 2, 2.

The location of the surface 3 of each edge e may be defined as being outside of a circle described from a center within the mandrel I and tangent to opposite surfaces 2, 2 (as apparent from Fig. 3). Of course both surfaces 3, 3 would lie on the circumference of a circle slightly larger than that in which the surfaces 2, 2 lie. The two pairs of surfaces 2, 2 and surfaces 3, 3 form supporting elements for bearings b, b of connecting rods R, R and a spacing cylinder C, as will appear more fully hereinafter.

There are three sockets 4, 4 and 5 within the mandrel I, the sockets 4, 4 having their longitudinal axes lying in a plane bisecting opposite surfaces 2, 2 and perpendicular to the plane upper surface 6 of the mandrel I, and the central socket 5 has its longitudinal axis lying on a plane bisecting the surfaces 3, 3 and also perpendicular to said top surface 6 of the mandrel. The sockets are all centrally disposed with respect to the opposite bearing surfaces 2, 2 and 3, 3 and are open at the bottom surface 7 of the mandrel. The closed end of each socket is spaced a short distance from the top surface 6 of the mandrel I and the bores 4', 4' of reduced diameter extend from the closed ends of the sockets 4, 4 to the surface 6 of the mandrel I. Similarly a bore 5' extends from the closed end of socket 5 to the top surface 6 of the mandrel. Plungers 8, 8 are positioned in sockets 4, 4 and have stems 9, 9 extending upwardly through bores 4', 4', said plungers being urged outwardly by coiled springs 10, 10 disposed on the stems 9 and confined between plungers 8 and ends of sockets 4, 4.

There is a similar plunger 11 within socket 5 having a stem 12 traversing the bore 5', on which stem is a coiled spring 13 somewhat heavier than the coiled springs 10, 10. The coiled spring 13 exerts its tension so as to urge the plunger 11 outwardly.

A plate 14 is mounted on the top surface 6 of the mandrel I and has three inclined portions 15, 16 and 15, in which there are slots 17, 18 and 17 traversed respectively by the plunger stems 9, 12 and 9. At the ends of the plunger stems are washers 19, 20 and 19 held in place by the turned over extremities 21, 22 and 21 of the stems. When the plungers 8 and 11 are forced outwardly under the influence of their respective springs the washers 19 and 20 will bear on the plate 14. The inclined portions 17 and 16 of the plate 14 serve as cam surfaces to lift the plungers 8 and 11 as the plate is moved forwardly on the mandrel 1. To facilitate the movement of the plate both forward and backward there is an upwardly turned finger piece 14' on its inner end and a downwardly turned finger piece 14" at its outer end.

The fixture for holding the connecting rod bearings b, b and the spacing cylinder C in assembled relation comprises annular plates 23 and 24 provided with marginal lugs 25, 25 and 26, 26, respectively. Bolts 27, 27 are fixed into openings 28, 28 in the lugs 25, 25 of plate 23 and have reduced threaded extremities 29, 29 which are passed through openings 30, 30 in lugs 26, 26. Nuts 31, 31 are screwed over the threaded extremities 29, 29 of the bolts 27, 27 to hold the plates 23, 24 in clamping relation with the connecting rod bearings b, b and spacing cylinder C. This will be more clearly apparent from the description of the operation of the invention as follows:

The connecting rods R, R are similar and it is desired to regrind their bearings b, b so that they may again be truly fitted to a crank-shaft (not shown). Before the grinding operation can be performed the bearings must be brought into axial alinement in order that they may be simultaneously and uniformly ground. This is accomplished by mounting said bearings b, b together with the spacing cylinder C on the mandrel 1, after first having slipped the fixture plate 23 over the mandrel so that it will be available for co-operation with the second plate 24 to hold the bearings in assembled relation. Before placing the bearings b, b and the spacing cylinder C on the mandrel the operator pushes the sliding plate 14 forwardly so that the cam surfaces 15 and 16 will retract the plungers 8, 8 and 11. The first connecting rod R is then disposed over the mandrel and allowed to rest thereon with the inner surface of bearing b supported by the opposite supporting elements 2, 2. The spacing cylinder C is then placed over the mandrel and rests on the supporting elements 3, 3. The second connecting rod is now placed on the mandrel and is likewise supported by a second pair of supporting elements 2, 2. The operator now pulls inwardly on the sliding plate 14 so as to withdraw the cam surfaces 15, 16 and 15 from the heads of the stems 9, 12 and 9, respectively, which allows the springs 10, 13 and 10 to force the plungers outwardly and bear against the inner surface of the bearings b and spacing cylinder C. The plungers 8, 11 and 8 operate away from the supporting elements 2, 2, 3, 3 and 2, 2 so that the respective bearings b, b and spacing cylinder C will be held firmly on said supporting elements.

The inner surface of the spacing cylinder C (as may be seen in the drawings) is of slightly greater diameter than the inner surfaces of the bearings b, b so that it will lie outside of the cylinder in which the inner surfaces of the bearings b, b lie. The pressure of the plungers 8, 11 and 8 provides three point support for the bearings b, b and spacing cylinder C and insures their axial alinement. Having the bearings b, b and spacing cylinder C firmly mounted on the mandrel the operator may now secure the end plates 23 and 24 together by drawing up on the nuts 31, 31 tightly. The bearings b, b and spacing cylinder C are now held in intimate assembled relation by means of the fixture and together with said fixture may be removed from the mandrel 1. This is done by pushing the sliding plate 14 outwardly so as to withdraw the plungers 8, 11 and 8 from engagement with the bearings and spacing cylinder, thereby permitting their removal from the mandrel 1, as shown in Fig. 5.

Since the inner surfaces of the bearings b, b lie substantially in the same cylinder the application of a rapidly rotating grinding stone simultaneously to said surfaces will effect a substantially uniform grinding thereof without contacting, however, the spacing cylinder, the inner surface C of which is outside of the inner surfaces of the bearings b, b.

Having described my invention, I claim:

1. A device for assembling connecting rod bearings preparatory to grinding the same, comprising a mandrel for receiving said bearings, means mounted in the mandrel for engaging said bearings to hold them in alinement thereon, means for clamping the bearings together, and means for releasing said bearing engaging means.

2. In a device for assembling connecting rod bearings preparatory to grinding the same, a mandrel on which said bearings may be mounted, said mandrel having a pair of parallel edges angularly spaced, means for holding the connecting rod bearings in contact with said edges, said means being angularly disposed with relation to the location of said edges, and means for moving said last mentioned means toward and from the longitudinal axis of the mandrel.

3. In a device for assembling connecting rod bearings preparatory to grinding the same, a mandrel having supporting elements for a plurality of bearings, said elements being parallel and co-extensive with the longitudinal axis of the mandrel and arranged in pairs, separate means for holding each bearing on its pair of supporting elements, and means for releasing said holding means.

4. In a device for assembling connecting rod bearings preparatory to grinding the same, a mandrel having supporting element for a plurality of bearings, said elements being parallel and co-extensive with the longitudinal axis of the mandrel and arranged in pairs, independent spring actuated means for holding each bearing on its pair of supporting elements, and means for releasing said holding means.

5. In a device for assembling connecting rod bearings preparatory to grinding the same, a mandrel and a member for maintaining the bearings in spaced relation thereon, said mandrel having a pair of angularly spaced, parallel supporting elements for each bearing, the supporting elements for the respective bearings being coincident, said mandrel also having a pair of supporting elements for the spacing member arranged between adjacent supporting elements for the bearings, the supporting elements for the spacing member being a greater distance radially from the longitudinal axis of mandrel than the supporting elements for the bearings, and separate means exerting pressure on the respective bearings and the spacing member to hold them on their supporting elements.

6. A device for assembling connecting rod bearings preparatory to grinding the same, comprising a mandrel for receiving said bearings, said mandrel embodying means for holding two bearings in alinement thereon, a spacing cylinder between said bearings, a fixture for holding the bearings and spacing cylinder in assembled relation, and means for releasing the bearing holding means to permit removal of the assembled bearings and fixture from the mandrel.

7. In a device for assembling connecting rod bearings preparatory to grinding the same, a mandrel and a spacing cylinder for cooperation therewith, said mandrel having supporting elements for the spacing cylinder and supporting elements adjacent thereto for the connecting rod bearings, separate means for holding each bearing and the spacing cylinder on its supporting elements, and means for releasing said holding means.

8. In a device for assembling a pair of connecting rod bearings preparatory to grinding the same, a spacing cylinder disposed between the connecting rod bearings, a mandrel having supporting elements for each of said bearings, the elements for the respective bearings being longitudinally spaced and corresponding elements being co-linear, supporting elements for the spacing cylinder lying outside the periphery of a cylinder intersecting the supporting elements for the bearings, and means for holding in assembled relation said bearings and spacing cylinder.

JOSEPH SUNNEN.